United States Patent [19]
Suzuki et al.

[11] Patent Number: 6,031,203
[45] Date of Patent: Feb. 29, 2000

[54] METHOD AND APPARATUS FOR DETERMINING STABILITY OF ARC WELDING

[75] Inventors: Yukimitsu Suzuki, Anjo; Katsunori Miyazaki; Taro Kamiya, both of Toyota, all of Japan

[73] Assignees: Central Motor Wheel Co., Ltd., Anjo, Japan; Hirose Technology Co., Ltd., Toyota, Japan

[21] Appl. No.: 09/175,564

[22] Filed: Oct. 20, 1998

[30] Foreign Application Priority Data

Oct. 22, 1997 [JP] Japan .................................. 9-289738
Oct. 22, 1997 [JP] Japan .................................. 9-289739
Oct. 22, 1997 [JP] Japan .................................. 9-289740

[51] Int. Cl.$^7$ .................................................. B23K 9/095
[52] U.S. Cl. ..................................................... 219/130.01
[58] Field of Search ........................ 219/130.01, 130.21, 219/130.31, 130.32, 130.33, 137 PS

[56] References Cited

U.S. PATENT DOCUMENTS

| | | | |
|---|---|---|---|
| 4,103,141 | 7/1978 | Wristen | 219/130.01 |
| 4,605,836 | 8/1986 | Retfalvi et al. | 219/130.01 |
| 5,221,825 | 6/1993 | Siewert et al. | |
| 5,521,354 | 5/1996 | Ludewig et al. | 219/130.01 |
| 5,750,957 | 5/1998 | Kilty et al. | |
| 5,756,967 | 5/1998 | Quinn et al. | 219/130.01 |

FOREIGN PATENT DOCUMENTS

| | | |
|---|---|---|
| B2-2-62017 | 12/1990 | Japan . |
| B2-5-57070 | 8/1993 | Japan . |
| B2-6-53309 | 7/1994 | Japan . |
| B2-6-53310 | 7/1994 | Japan . |
| B2-7-2275 | 1/1995 | Japan . |

*Primary Examiner*—Clifford C. Shaw
*Attorney, Agent, or Firm*—Oliff & Berridge, PLC

[57] ABSTRACT

A method and apparatus for determining the stability of arc welding between a base metal and a welding electrode. A welding current for the arc period and a welding current for the short-circuit period fed from a welding power source are sampled every cycle of the repetition of arc and short-circuit, in accordance with a predetermined sampling frequency. The welding current for the arc period is integrated, and a standard deviation of the integrated welding current for the arc period is calculated. The standard deviation of the integrated welding current for the short-circuit period is calculated, as well. These standard deviations are multiplied together to produce a product, so that a welding stability parameter is calculated on the basis of the product. Then, the welding stability parameter is compared with a predetermined reference value. In response to the result of comparison, the welding stability between the base metal and the welding electrode is determined. A time ratio of the arc period and the short-circuit period may be calculated every cycle of the repetition of arc and short-circuit, and a standard deviation of the time ratio may be calculated. Then, the product may be multiplied by the standard deviation of the time ratio to calculate the welding stability parameter.

6 Claims, 9 Drawing Sheets

METHOD AND APPARATUS FOR DETERMINING STABILITY OF ARC WELDING

BACKGROUND OF THE INVENTION

1. Field of the Invention

The present invention relates to a method for determining the stability of arc welding, and an apparatus therefor, especially the method and apparatus for use in a consumable electrode gas shield arc welding.

2. Description of the Related Arts

In recent arc welding systems, the output control of a welding power source has been shifted from the one of a thyristor type to the one of an inverter type, so that the control speed has been increased from 300 Hz to 15–60 kHz, thereby to be 50–200 times faster than the prior apparatuses, and that waveform control of the welding current and welding voltage can be made. Consequently, an improvement in arc starting property, improvement in the welding stability during a high speed arc welding, reduction of the amount of spatters produced in arc welding, and the like are effected, so that the welding stability in arc welding is being improved effectively. However, not only a starting stage, which is a welding operation stage provided when the arc welding starts, is unstable, but also it is difficult to maintain a stable welding quality even in a steady-state stage, which is the welding operation stage performed immediately after the starting stage, because the welding condition is varied due to machining strain, thermal strain or the like. Therefore, the instability of arc welding was a bar to countermeasures which are contemplated to prevent the products of bad welding quality from being produced due to the instability of the welding conditions caused in an automatic welding line by means of a welding robot or the like, and a partially automatic welding line. In addition, the determination of the welding stability in the prior arc welding system was relying on a qualitative determination through a visual examination.

Accordingly, various countermeasures have been contemplated, and various methods for determining the welding stability have been proposed. For example, a Japanese Patent Publication for opposition No. 2-62017 discloses a method for calculating a short-circuit time, arc time, short-circuit average current, arc average current, arc average resistance and arc electric power for each period or cycle, and calculating standard deviations of them to indicate a uniformity of the arc condition, arc terminating frequency and arcing level to determine a weldability. Also, a Japanese Patent Publication for opposition No. 5-57070 proposes a method for detecting the short-circuit time and arc time for each period by measuring a welding voltage, and obtaining an average or a standard deviation of the short-circuit time and the average or standard deviation of the arc time, based on which a welding parameter is calculated, to determine the weldability on the basis of the welding parameter. Furthermore, a Japanese Patent Publication for opposition No. 6-53310 proposes a method for representing a rate of variation of heat applied to the base metal and the wire during the short-circuit is formed between them, by employing a standard deviation of at least one of the maximum short-circuit current, an average of the current during the short-circuit, an effective current during the short-circuit, and an electric power during the short-circuit, to determine the weldability on the basis of the standard deviation.

In a Japanese Patent Publication for opposition No. 7-2275, proposed is an arc welding monitoring apparatus which measures the welding current and welding voltage, and uses a method of moving average to calculate a moving average of the welding current on the basis of the measured data. Furthermore, proposed are properly selecting a calculation time period and a moving pitch for calculating the moving average, and providing a monitoring period so as to avoid the period immediate before the start of arc welding, and the period immediate before the termination of the welding. In order to perform an optimal control of $CO_2$ or MAG welding system by setting optimal welding conditions automatically, an optimal control method for arc welding is proposed in Japanese Patent Publication for opposition No. 6-53309. More concretely, a parameter for detecting the weldability quantitatively (referred to as weldability parameter (W)) is calculated by a short-circuit time (Ts), arc time (Ta), average current in the short-circuit period (Is'ave), average current in the arc period (Ia'ave), average resistance in the arc period (Ra'ave), and electric power in the arc period (Pa), as $W=(\sigma_{Ts} \cdot \sigma_{Ta} \cdot \sigma_{Is}\text{'ave} \cdot \sigma_{Ia}\text{'ave}/K) \cdot (\text{Ra'ave/Ri}) \cdot (\text{Pa/Pi})$, where $\sigma_{Ts}$ is the standard deviation of Ts, $\sigma_{Ta}$ is the standard deviation of Ta, $\sigma_{Is}$'ave is the standard deviation of Is'ave, $\sigma_{Ia}$'ave is the standard deviation of Ia'ave, K is a product of $\sigma_{Ts} \cdot \sigma_{Ta} \cdot \sigma_{Is}\text{'ave} \cdot \sigma_{Ia}\text{'ave}$ under a reference welding condition, Ri is a regression of Ra'ave under the optimal condition, and Pi is a regression of Pa under the optimal condition. Then, the outputs of the welding power source and the feeding amount of the wire are controlled so as to minimize the weldability parameter.

According to the above-described methods for determining the welding conditions disclosed in the above-described prior publications, however, an error is likely caused in determining the welding stability. For example, the average current in the arc period, which is employed in the Publication No. 2-62017, is easily varied depending upon the arc time. In the Publication No. 5-57070, the average of the short-circuit time and the average of the arc time are multiplied by the constants, respectively, and the sum of them is employed as the welding stability parameter. The method in the Publication No. 6-53309 uses the average of data. And, the method in the Publication No. 6-53310 uses the standard deviation of data only in the short-circuit period, without using the data in the arc period. Although the publication No. 7-2275 proposes to use the method of moving average, the determination is made based on the average of data. Thus, the above-described prior methods for determining the stability of arc welding are unsatisfactory, and some of them take a relatively long time to be analyzed, so that it is difficult to maintain the stability of arc welding. According to the methods in the publication Nos. 2-62017 and 6-53309, the parameters to be used in determining the stability are many, and the methods of processing them are complicated, so that it will take a relatively long time to determine the welding stability, and a software for use in determining the same will be of a great volume, so that a large capacity of memory will be needed.

SUMMARY OF THE INVENTION

Accordingly, it is an object of the present invention to provide a method for determining the stability of arc welding quickly and properly, at a real time.

It is another object of the present invention to provide an apparatus for determining the stability of arc welding quickly and properly, at a real time.

In accomplishing the above and other objects, the method for determining a stability of arc welding between a base metal and a welding electrode, with a welding voltage applied thereto by a welding power source to supply a welding current, repeating arc and short-circuit between the base metal and the welding electrode. The method includes the steps of (1) sampling the welding current for the arc period and the welding current for the short-circuit period fed from the welding power source into the base metal and the welding electrode, every cycle of the repetition of arc and short-circuit, in accordance with a predetermined frequency, (2) integrating the welding current for the arc period, and calculating a standard deviation of the integrated welding current for the arc period, (3) integrating the welding current for the short-circuit period, and calculating a standard deviation of the integrated welding current for the short-circuit period, (4) multiplying the standard deviation of the welding current for the arc period by the standard deviation of the welding current for the short-circuit period to produce a first product, (5) calculating a welding stability parameter on the basis of the first product, (6) comparing the welding stability parameter with a predetermined reference value, and (7) determining the welding stability between the base metal and the welding electrode in response to the result of comparison.

The method for determining the stability of arc welding may include the steps of (1) sampling the welding voltage for the arc period and the welding voltage for the short-circuit period applied by the welding power source to the base metal and the welding electrode, every cycle of the repetition of arc and short-circuit, in accordance with a predetermined frequency, (2) integrating the welding voltage for the arc period, and calculating a standard deviation of the integrated welding voltage for the arc period, (3) integrating the welding voltage for the short-circuit period, and calculating a standard deviation of the integrated welding voltage for the short-circuit period, (4) multiplying the standard deviation of the welding voltage for the arc period by the standard deviation of the welding voltage for the short-circuit period to produce a second product, (5) calculating a welding stability parameter on the basis of the second product, (6) comparing the welding stability parameter with a predetermined reference value, and (7) determining the welding stability between the base metal and the welding electrode in response to the result of comparison.

The step of calculating the welding stability parameter may include the step of multiplying the standard deviation of the welding current for the arc period, the standard deviation of the welding current for the short-circuit period, the standard deviation of the welding voltage for the arc period, and the standard deviation of the welding voltage for the short-circuit period, together, thereby to calculate the welding stability parameter.

Preferably, the method for determining the stability of arc welding may further include the steps of (1) calculating a time ratio of the arc period and the short-circuit period every cycle of the repetition of arc and short-circuit, (2) calculating a standard deviation of the time ratio, and (3) multiplying at least one of the first product and the second product by the standard deviation of the time ratio. The step of calculating the welding stability parameter may include the step of calculating the welding stability parameter on the basis of one of a third product obtained by multiplying the first product by the standard deviation of the time ratio, a fourth product obtained by multiplying the second product by the standard deviation of the time ratio, and a fifth product obtained by multiplying the first product, the second product and the standard deviation of the time ratio together.

Accordingly, the welding stability parameter may be calculated by multiplying the standard deviation of the welding current for the arc period, the standard deviation of the welding current for the short-circuit period, the standard deviation of the welding voltage for the arc period, the standard deviation of the welding voltage for the short-circuit period, and the standard deviation of the time ratio, together.

The method may further include the step of dividing at least one of a duration for detecting the welding current and a duration for detecting the welding voltage into a plurality of detecting ranges. The step of calculating the welding stability parameter may include the step of calculating the welding stability parameter in each detecting range, respectively. The step of comparing the welding stability parameter may include the step of comparing the welding stability parameter in each detecting range with a predetermined reference, respectively. And, the step of determining the welding stability between the base metal and the welding electrode may include the step of determining the welding stability between the base metal and the welding electrode in response to the result of comparison in each detection range, respectively.

The apparatus for determining the stability of arc welding includes means for performing the steps as described above, and will be described in detail hereinafter.

BRIEF DESCRIPTION OF THE DRAWINGS

The above stated object and following description will become readily apparent with reference to the accompanying drawings, wherein like reference numerals denote like elements, and in which.

DESCRIPTION OF THE PREFERRED EMBODIMENTS

Figure 1:
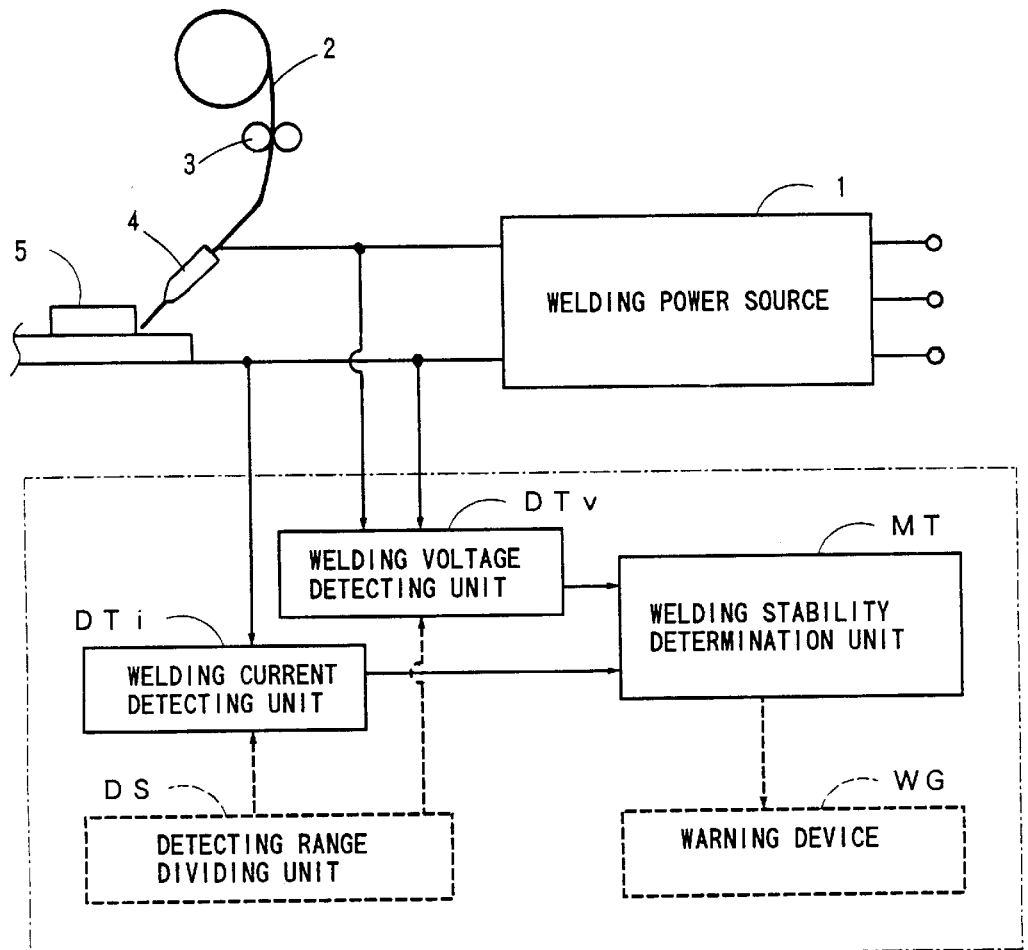
FIG. 1 is a general block diagram illustrating an arc welding system according to an embodiment of the present invention.

Referring to FIG. 1, there is schematically illustrate a consumable electrode gas shield arc welding system (hereinafter, simply referred to as arc welding system), which includes a welding power source 1 for applying a welding voltage between a base metal 5 and a welding wire 2 served as a welding electrode, to supply a welding current thereto. The apparatus is adapted to repeat arc and short-circuit between the base metal 5 and the welding wire 2, so as to weld them. The welding wire 2 is coiled, with its tip end portion held by a contact tip 4, and arranged to be fed by a feeding roller 3 toward the base metal 5 at a predetermined speed. A welding current detecting unit DTi is provided for measuring the welding current supplied from the welding power source 1 to the base metal 5 and the welding wire 2, so as to detect the welding current for the arc period and the welding current for the short-circuit period fed into the base metal 5 and the welding wire 2, every cycle of the repetition of arc and short-circuit in the arc welding. Also, a welding voltage detecting unit DTv is provided for measuring the welding voltage applied by the welding power source 1, so as to detect the welding voltage for the arc period and the welding voltage for the short-circuit period applied to the base metal 5 and the welding wire 2, every cycle of the repetition of arc and short-circuit in the arc welding.

A welding stability determination unit MT is provided for integrating the welding current for the arc period based on the welding current detected by the unit DTi, and calculating a standard deviation of the integrated welding current for the arc period, and provided for integrating the welding current for the short-circuit period, and calculating a standard deviation of the integrated welding current for the short-circuit period. Likewise, the unit MT is provided for integrating the welding voltage for the arc period based on the welding voltage detected by the unit DTv, and calculating a standard deviation of the integrated welding voltage for the arc period, and provided for integrating the welding voltage for the short-circuit period, and calculating a standard deviation of the integrated welding voltage for the short-circuit period. The unit MT may be adapted to calculate a time ratio of the arc period and the short-circuit period every cycle of the repetition of arc and short-circuit, and calculate a standard deviation of the time ratio.

Then, according to the welding stability determination unit MT, the standard deviation of the integrated welding current for the arc period, standard deviation of the integrated welding current for the short-circuit period, standard deviation of the integrated welding voltage for the arc period, standard deviation of the integrated welding voltage for the short-circuit period, and standard deviation of the time ratio of the arc period and the short-circuit period are selectively combined to calculate a welding stability parameter, which is compared with a predetermined reference value to determine the welding stability between the base metal 5 and the welding wire 2 in response to the result of comparison. Thus, by selectively combining the standard deviations, various welding stability parameters can be provided. For example, one of the welding stability parameters can be obtained by multiplying at least the standard deviation of the integrated welding current for the arc period and the standard deviation of the integrated welding current for the short-circuit period. As indicated by a broken line in FIG. 1, a warning device WG may be provided for warning an instability of the arc welding, based on the result determined by the welding stability determination unit MT.

According to the present embodiment, a duration for detecting the welding current by the welding current detecting unit DTi and a duration for detecting the welding voltage by the welding voltage detecting unit DTv are divided into a plurality of detecting ranges, respectively, by a detecting range dividing unit DS as indicated by the broken line in FIG. 1. In the welding stability determination unit MT, therefore, the welding stability parameter can be calculated in each detecting range, and compared with the predetermined parameter in each detecting range, to determine the welding stability between the base metal 5 and the welding wire 2 in each detecting range, respectively. Furthermore, operation of the arc welding from its start to the end is divided into welding operation stages of a starting stage, steady-state stage and terminating stage, according to the present embodiment. That is, the state of arc immediately after starting the arc welding is unstable, so that the starting stage has a different characteristic from the steady-state stage. Therefore, the starting stage is distinguished from the steady-state stage. On the contrary, the state of arc close to a stage for terminating the arc welding is unstable, because the welding wire is attenuated according to a specific time constant, and a part resulted therefrom is needed to be melted, so that the terminating stage has a different characteristic from the steady-state stage. Therefore, the terminating stage is distinguished from the steady-state stage. As a result, the welding operation stage of the arc welding is divided into three stages of the starting stage, steady-state stage and terminating stage, according to the present embodiment. The welding stability parameter is calculated in each welding operation stage, and a reference factor or the reference value is provided for each stage. Accordingly, the welding stability parameter in each welding operation stage is compared with the reference factor or reference value for each stage to determine the welding stability between the base metal 5 and the welding metal 2.

Figure 2:
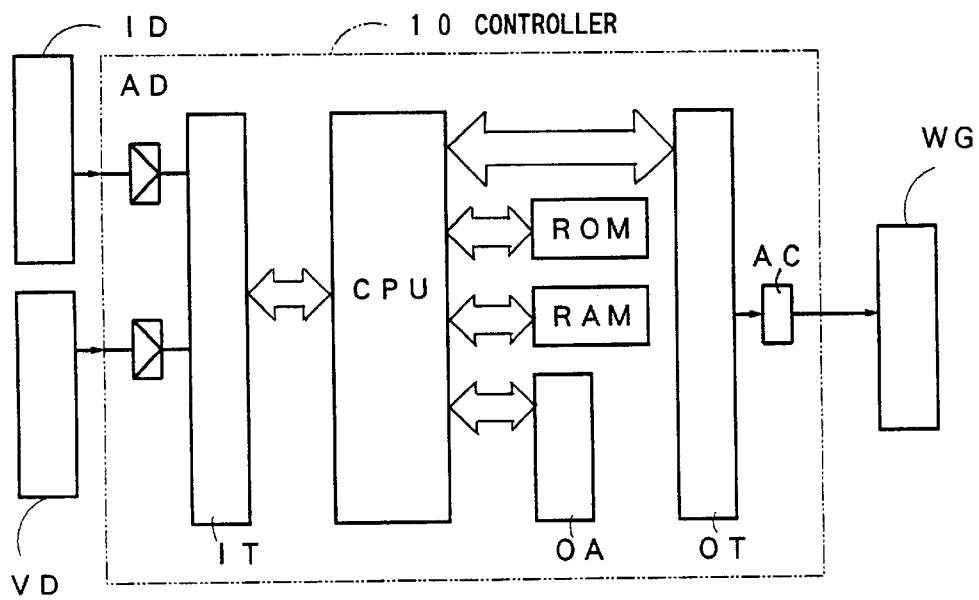
FIG. 2 is a schematic block diagram of a section enclosed by a one-dot chain line in FIG. 1.

More specifically, the details of the embodiment disclosed in FIG. 1 will be explained with reference to FIGS. 2 to 9. According to the present embodiment, a section surrounded by a one-dot chain line as indicated in FIG. 1 is constituted as shown in FIG. 2. An electronic controller 10 is provided with a central processing unit or CPU, a read-only memory or ROM, a random access memory or RAM, an input interface IT, an output interface OT, and accessories including a keyboard, display, printer and etc. (represented by "OA" in FIG. 2). A welding current detecting circuit ID, a welding voltage detecting circuit VD and the warning device WG are connected to the controller 10. The signals output from the welding current detecting circuit ID and welding voltage detecting circuit VD are fed to the input interface IT via respective analog to digital converters AD and then to the central processing unit CPU. Then, a control signal is fed from the output interface OT to the warning device WG via a driving circuit AC. As for the warning device WG, a display, speaker and etc. (not shown) may be employed. Thus, the welding current detecting circuit ID and welding voltage detecting circuit VD are included in the welding current detecting unit DTi and the welding voltage detecting unit DTv as shown in FIG. 1, respectively, and other components are included in the controller 10. According to the controller 10, the read-only memory ROM memorizes a program for performing various controls including those defined in flowcharts of FIGS. 5 to 9, the central processing unit CPU executes the program while the arc welding is performed, and the random access memory RAM temporarily memorizes variable data needed to execute the program.

Figure 3:
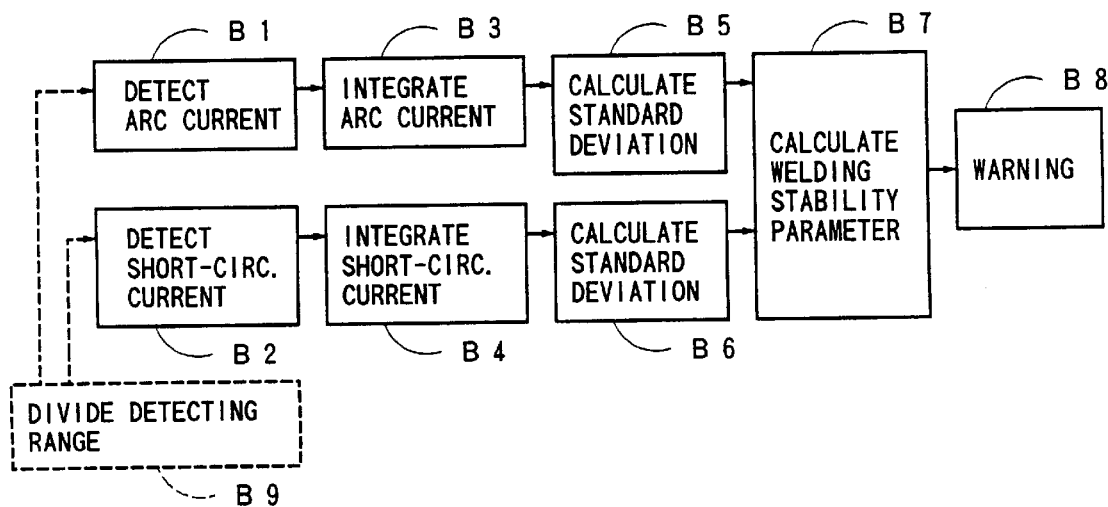
FIG. 3 is a block diagram showing function blocks constituted in a controller as shown in FIG. 2.

FIG. 3 is a block diagram showing an example of function blocks constituted in the controller 10. The welding voltage detecting unit DTv and the functions related thereto are omitted in FIG. 3 to simplify the explanation. In Blocks B1 and B2, detected are the welding current for the arc period (indicated as IA(n)) and the welding current for the short-circuit period (indicated as IS(n)) in each cycle of the repetition of arc and short-circuit. These are integrated to produce the integrated value ($\int IA(n)dt$) of the welding current for the arc period (IA(n)), and the integrated value ($\int IS(n)dt$) of the welding current for the short-circuit period (IS(n)), in Blocks B3 and B4 respectively. Then, calculated in Blocks B5 and B6 are the standard deviation ($\sigma(\int IA(n)dt)$) of the integrated value of welding current for the arc period, and the standard deviation ($\sigma(\int IS(n)dt)$) of the integrated value of the welding current for the short-circuit period. On the basis of the standard deviations ($\sigma(\int IA(n)dt)$) and $\sigma(\int Is(n)dt)$) the welding stability parameter is calculated in Block B7, and then the welding stability between the base metal 5 and the welding wire 2 is determined on the basis of the welding stability parameter. In the case where the welding voltage is also employed to calculate the welding stability parameter, Blocks corresponding to Blocks 1–6 may be provided in parallel therewith, with respect to the welding voltage. Then, if the welding stability between the base metal 5 and the welding wire 2 is determined to be unstable or defective on the basis of the welding stability parameter, warning may be performed in Block B8. Furthermore, in Block B9 as indicated by broken lines in FIG. 3, the detecting duration may be divided into a plurality of detecting ranges, manually.

Figure 4:
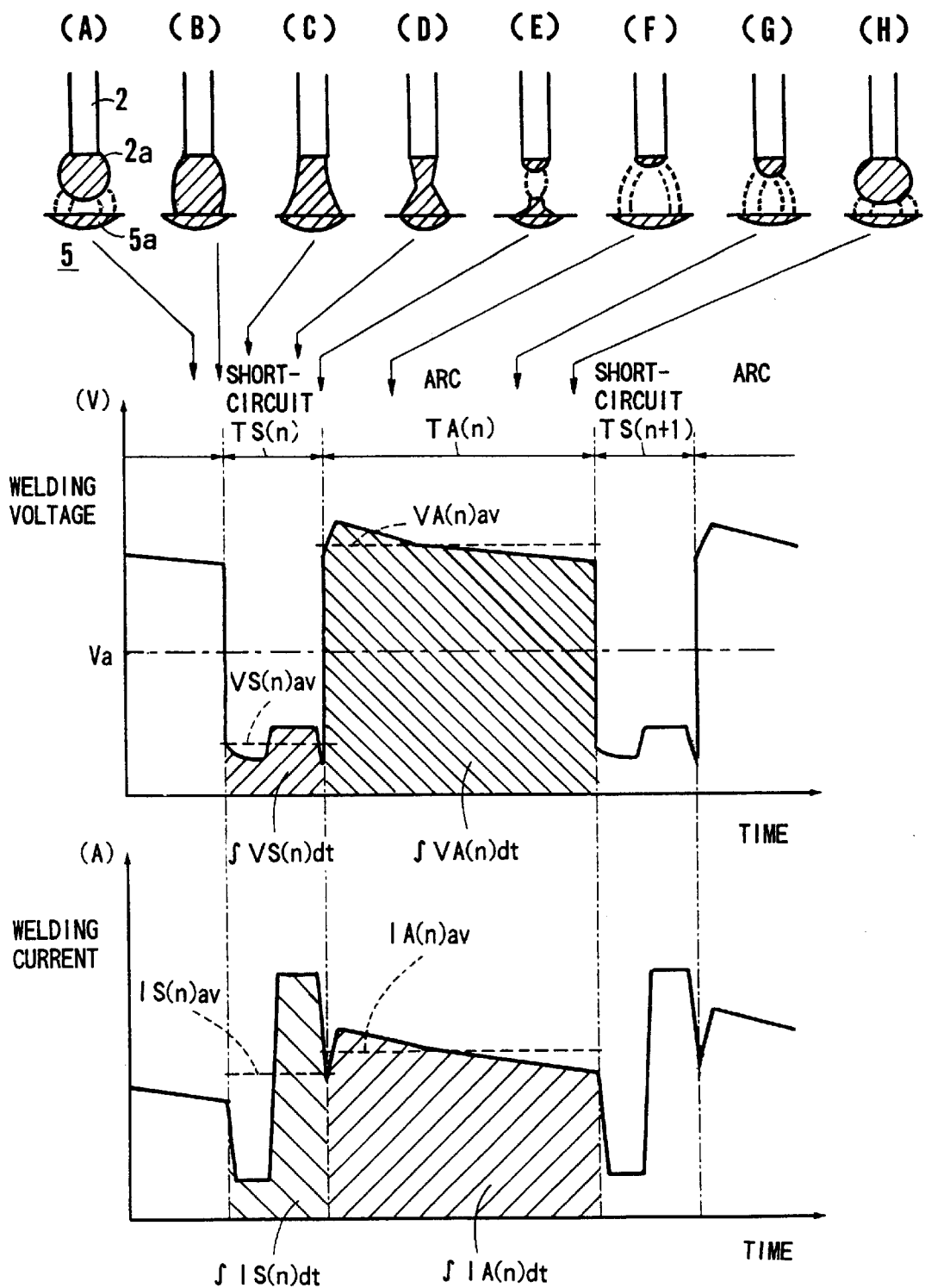
FIG. 4 is a diagram showing variation of a droplet formed in arc welding, and waveforms of the welding voltage and welding current applied to a welding electrode and a base metal.

FIG. 4 illustrates a transfer of a droplet formed in arc welding, and shows waveforms of the welding voltage and welding current, which are applied to the welding electrode 2 and the base metal 5 corresponding to the transfer of the droplet. When the welding voltage is applied between the welding electrode 2 and the base metal 5 to supply the welding current thereto, the droplet is transferred from (A) to (H) as shown in FIG. 4 in a single cycle of arc and short-circuit. That is, the tip end of the welding wire 2 and the base metal 5 are melted to form the droplet 2a and a molten pool 5a, respectively. As a result, the droplet 2a is transferred to the molten pool 5a to form a weld metal (bead). In this case, the welding voltage and welding current are varied as shown in the upper section and lower section of FIG. 4, respectively. As clearly indicated in FIG. 4, the welding voltage is changed rapidly, in the transition from the arc period to the short-circuit period, and vice versa. Therefore, the arc period and the short-circuit period can be clearly distinguished by a reference voltage for determining arc/short-circuit (Va) as shown in FIG. 4. In FIG. 4, "TS(n)" indicates the short-circuit time in a period or cycle of "n", "TA(n)" indicates the arcing time in the cycle of "n", and "TS(n+1)" indicates the short-circuit time in the cycle of "n+1". "$\int IS(n)dt$" is the integrated value of the welding current for the short-circuit period in the cycle of "n", and "$\int IA(n)dt$" is the integrated value of the welding current for the arc period in the cycle of "n". "$\int VS(n)dt$" is the integrated value of the welding voltage for the short-circuit period in the cycle of "n", and "$\int VA(n)dt$" is the integrated value of the welding voltage for the arc period in the cycle of "n". Furthermore, indicated by broken lines for reference in FIG. 4 are an average current for the arc period (IA(n)av), an average current for the short-circuit period (IS(n)av), an average voltage for the arc period (VA(n)av), and an average voltage for the short-circuit period (VS(n)av).

Figure 5:
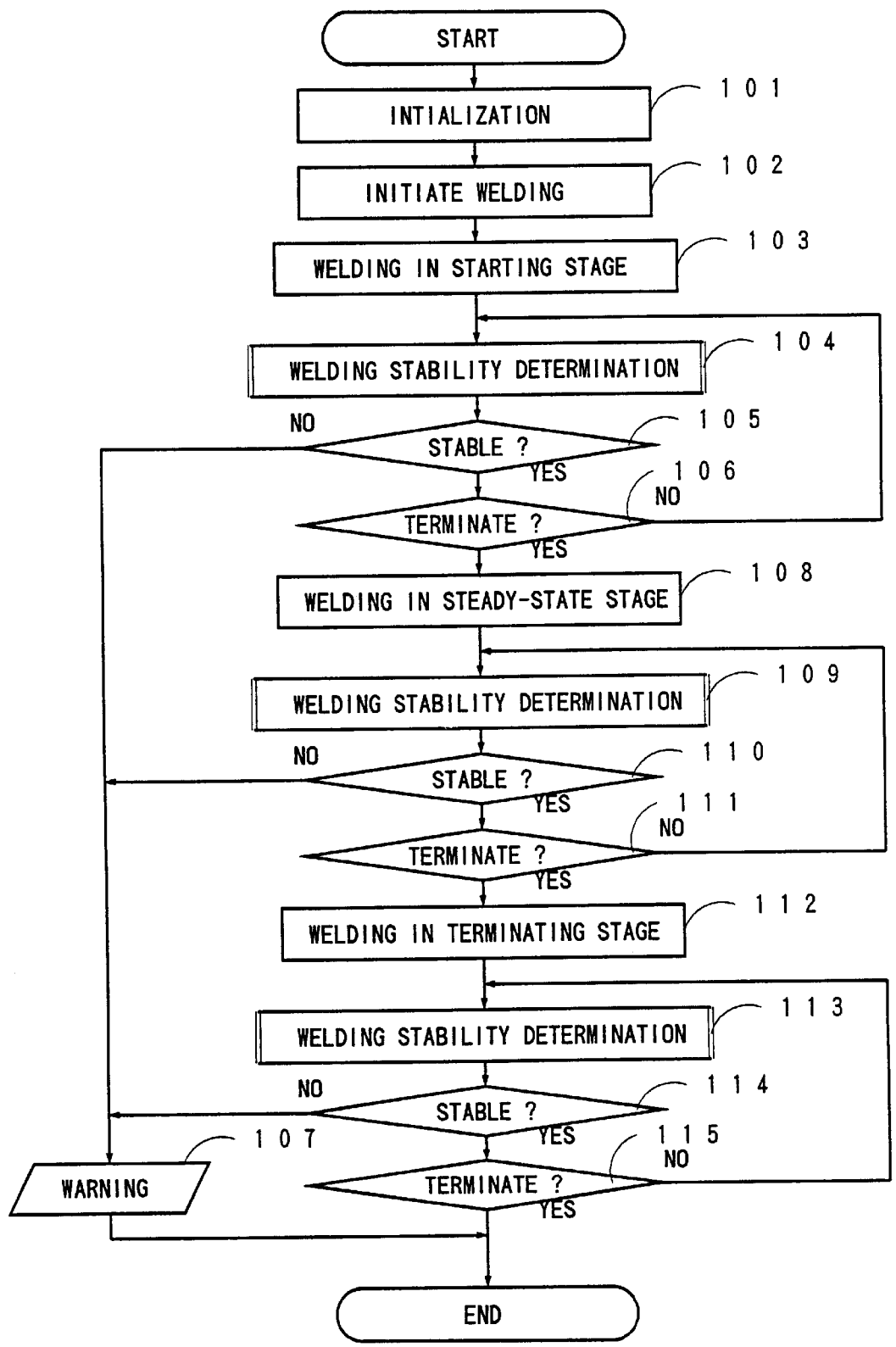
FIG. 5 is a flowchart showing a main routine of the arc welding according to the above embodiment of the present invention.

According to the present embodiment as constituted above, a program routine for the control of the welding current or the like is executed by the electronic controller 10, as will be described hereinafter with reference to FIGS. 5–9. The program routine corresponding to flowcharts as shown in FIGS. 5–9 starts when the welding power source 1 is activated. FIG. 5 shows an overall operation of the arc welding. At the outset, initialization is made to input a sampling rate, trigger level, the reference voltage for determining arc/short-circuit (Va) or the like, by means of the keyboard (not shown) for example. The sampling rate is set to be greater than a control speed of the welding power source 1, e.g., 27 kHz according to the present embodiment, so as to determine the waveform of the output signal of the welding power source 1, but it may be set to other values. When the welding voltage is increased to reach the trigger level, the welding voltage and welding current will start to be input to the controller 1. After the initialization, the arc welding starts at Step 102, then the program proceeds to Step 103, where the arc welding in the starting stage is performed. Then, the welding stability of arc welding in the starting stage is determined, as will be described later in detail. On the basis of the result of determination of the welding stability made at Step 104, if the arc welding in the starting stage is determined to be stable at Step 105, the program proceeds to Step 106, where the condition for terminating the starting stage is determined. If it is determined that the condition for terminating the starting stage is not fulfilled, the program returns to Step 104, whereas if it is determined that the terminating condition is fulfilled, the program proceeds to Step 108. At Step 105, if it is determined that the arc welding in the starting stage is unstable, the program proceeds to Step 107, where a warning signal is output.

When the starting stage is terminated, the program proceeds to Step 108, where the arc welding in the steady-state stage is initiated. Then, the program proceeds to Step 109 where the welding stability of arc welding in the steady-state stage is determined, as will be described later in detail with reference to FIG. 6. On the basis of the result of determination of the welding stability made at Step 109, if the arc welding in the steady-state stage is determined to be stable at Step 110, the program proceeds to Step 111, where the condition for terminating the steady-state stage is determined. If it is determined that the condition for terminating the steady-state stage is fulfilled, the program proceeds to Step 112, where the arc welding in the terminating stage is initiated. On the contrary, if it is determined that the terminating condition is not fulfilled, the program returns to Step 109. At Step 110, if it is determined that the arc welding in the steady-state stage is unstable, the program proceeds to Step 107, where the warning signal is output.

If it is determined at Step 111 that the condition for terminating the steady-state stage is fulfilled, the program proceeds to Step 112, where the arc welding in the terminating stage is initiated, and then the welding stability of arc welding in the terminating stage is determined at Step 113. On the basis of the result of determination of the welding stability made at Step 113, if the arc welding in the terminating stage is determined to be stable at Step 114, the program proceeds to Step 115, where the condition for terminating the terminating stage, i.e., terminating the arc welding as a whole, is determined. If it is determined that the condition for terminating the terminating stage is not fulfilled, the program returns to Step 113, whereas if it is determined that the terminating condition is fulfilled, the program proceeds to Step 115, where the whole operation of the program will end. At Step 114, if it is determined that the arc welding in the terminating stage is unstable, the program proceeds to Step 107, where the warning signal is output. According to the present embodiment, therefore, the arc welding operation from its start to its end is divided into the starting stage, steady-state stage and terminating stage, in advance. Notwithstanding that the terminating stage indicates a different characteristic from the steady-state stage, the welding stability determination in the terminating stage is made in a similar fashion to the welding stability determination in the steady-state stage, by changing the reference value, for example. With respect to the welding stability determination in the starting stage which is made immediately after the arc welding starts, however, the state in arc welding is unstable, so that the welding stability parameter in the steady-state stage can not be applied to that in the starting stage, as it is. Therefore, various factors for determining the welding stability in the starting stage will have to be combined, as will be described later in detail.

Figure 6:
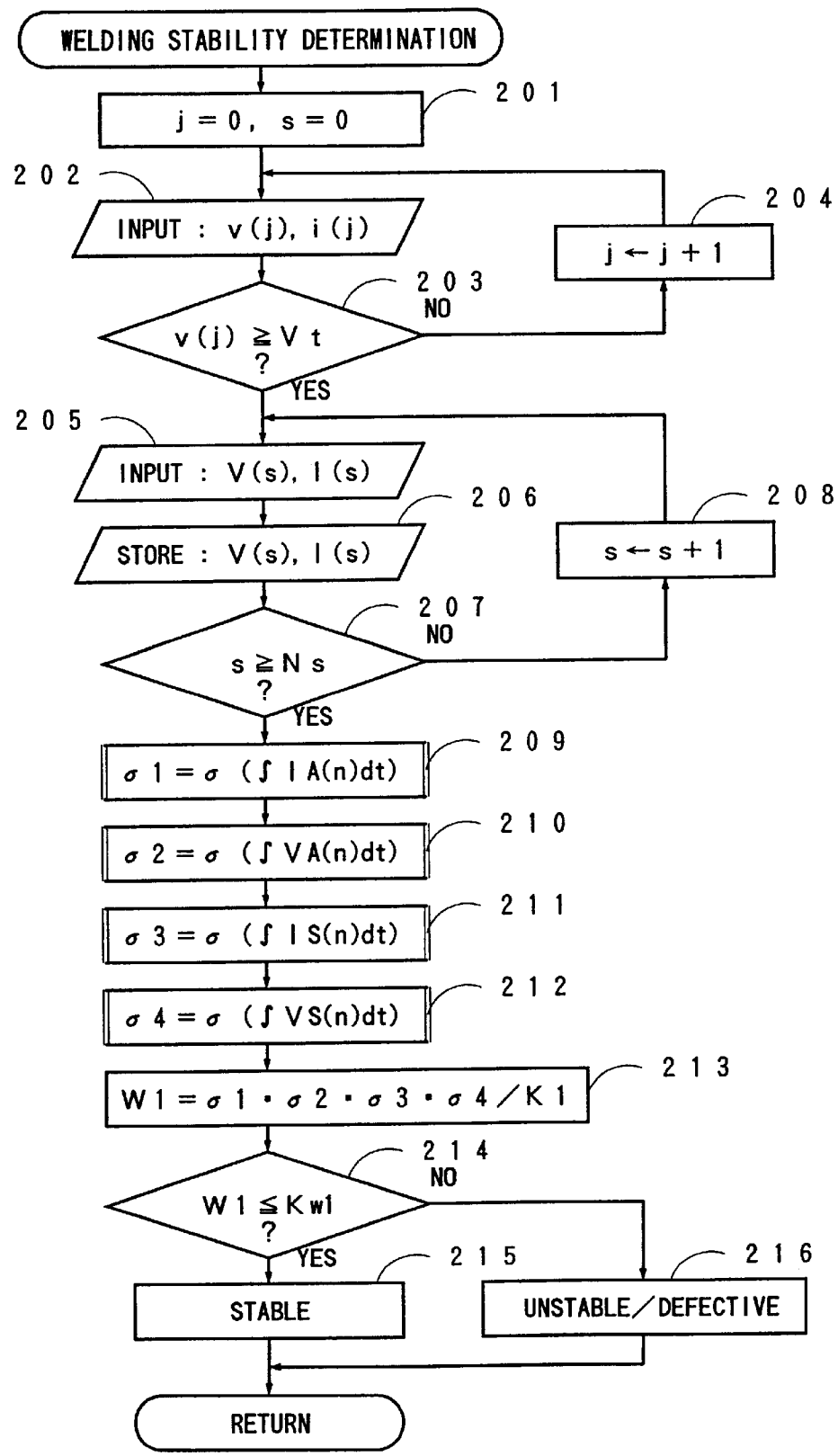
FIG. 6 is a flowchart showing a sub-routine of the welding stability determination of the arc welding according to the above embodiment.

FIG. 6 shows the determination of the welding stability executed at Steps 109, 113. At the outset, the sampling numbers (j) and (s) for use in determining the welding stability are cleared to be zero, respectively, at Step 201. Then, the welding voltage (v(j)) and the welding current (i(j)) are input at Step 202, and then the welding voltage (v(j)) is compared with a predetermined trigger level (Vt), at Step 203. If it is determined at Step 203 that the welding voltage (v(j)) is lower than the predetermined trigger level (Vt), the program proceeds to Step 204 where the sampling number (j) is incremented, and returns to Step 202. Thus, a stand-by state is provided until the welding voltage (v(j)) reaches the predetermined trigger level (Vt). When it is determined at Step 203 that the welding voltage (v(j)) is equal to or greater than the predetermined trigger level (Vt), the program proceeds to Step 205, where the welding voltage (V(s)) and the welding current (I(s)) exceeding the trigger level (Vt) are input, and they are stored in the memory RAM at Step 206, respectively. Then, the sampling number (s) is compared with a predetermined frequency (Ns) at Step 207. If the sampling number (s) has not reached the predetermined frequency (Ns), the program proceeds to Step 208 where the sampling number (s) is incremented, and returns to Step 205. Thus, by sampling the predetermined frequency (Ns) of the welding voltage and welding current, the welding voltage (V(s)) and the welding current (I(s)) exceeding the trigger level (Vt) are detected, and stored in the memory RAM.

Figure 7:
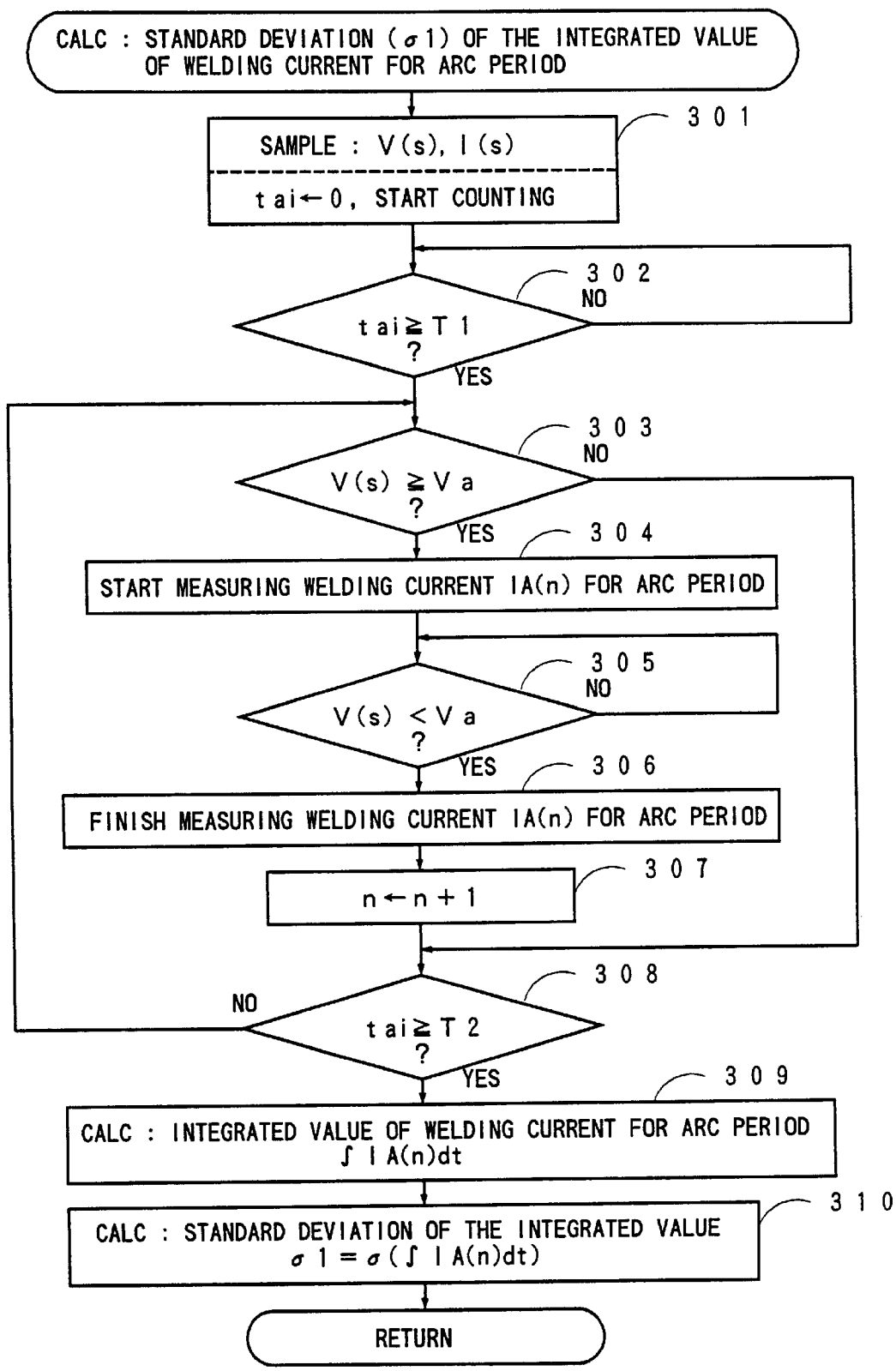
FIG. 7 is a flowchart showing a sub-routine of the calculation of the standard deviation of the integrated value of welding current for the arc period according to the above embodiment.
Figure 8:
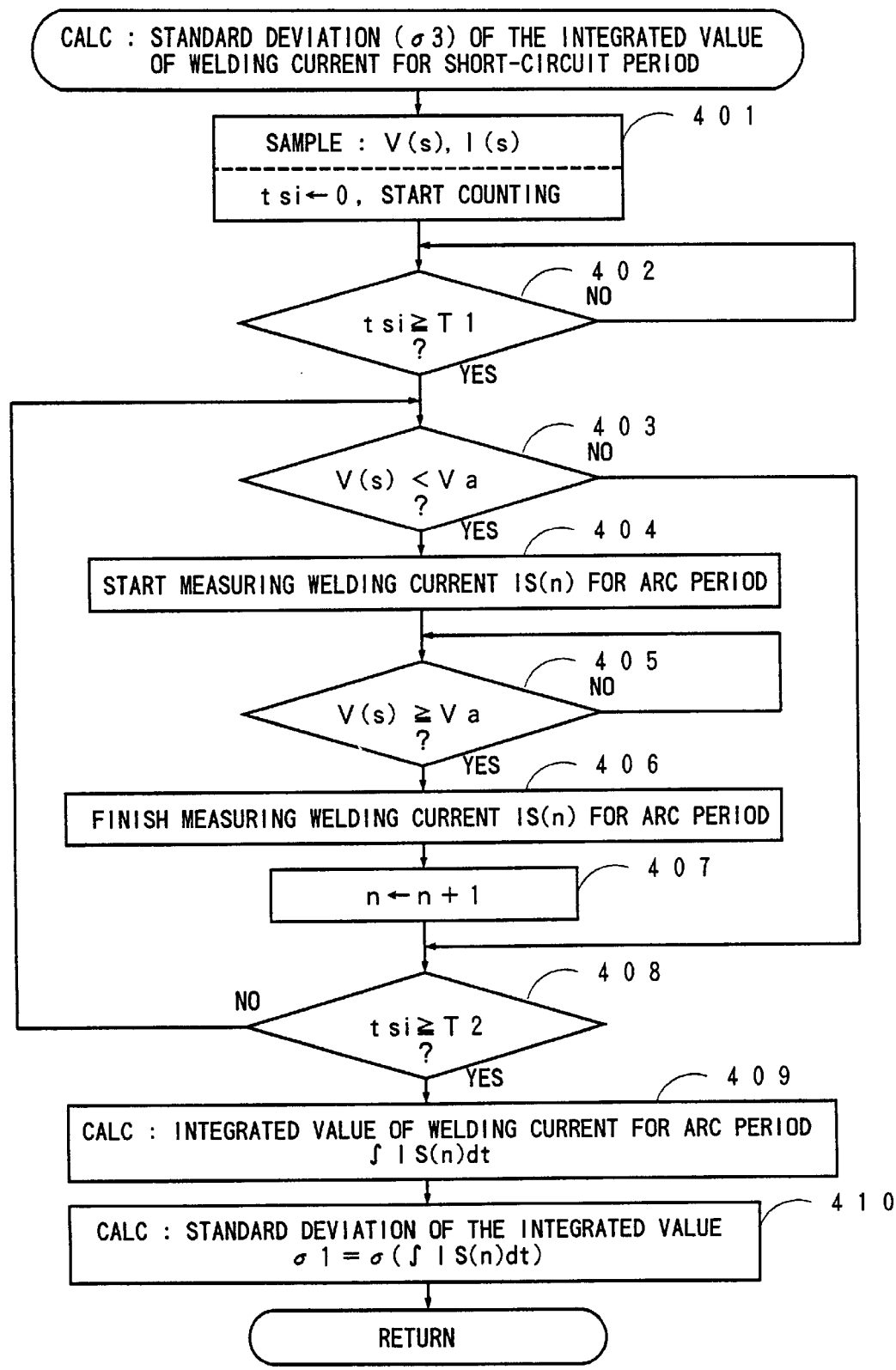
FIG. 8 is a flowchart showing a sub-routine of the calculation of the standard deviation of the integrated value of welding current for the short-circuit period according to the above embodiment.
Figure 9:
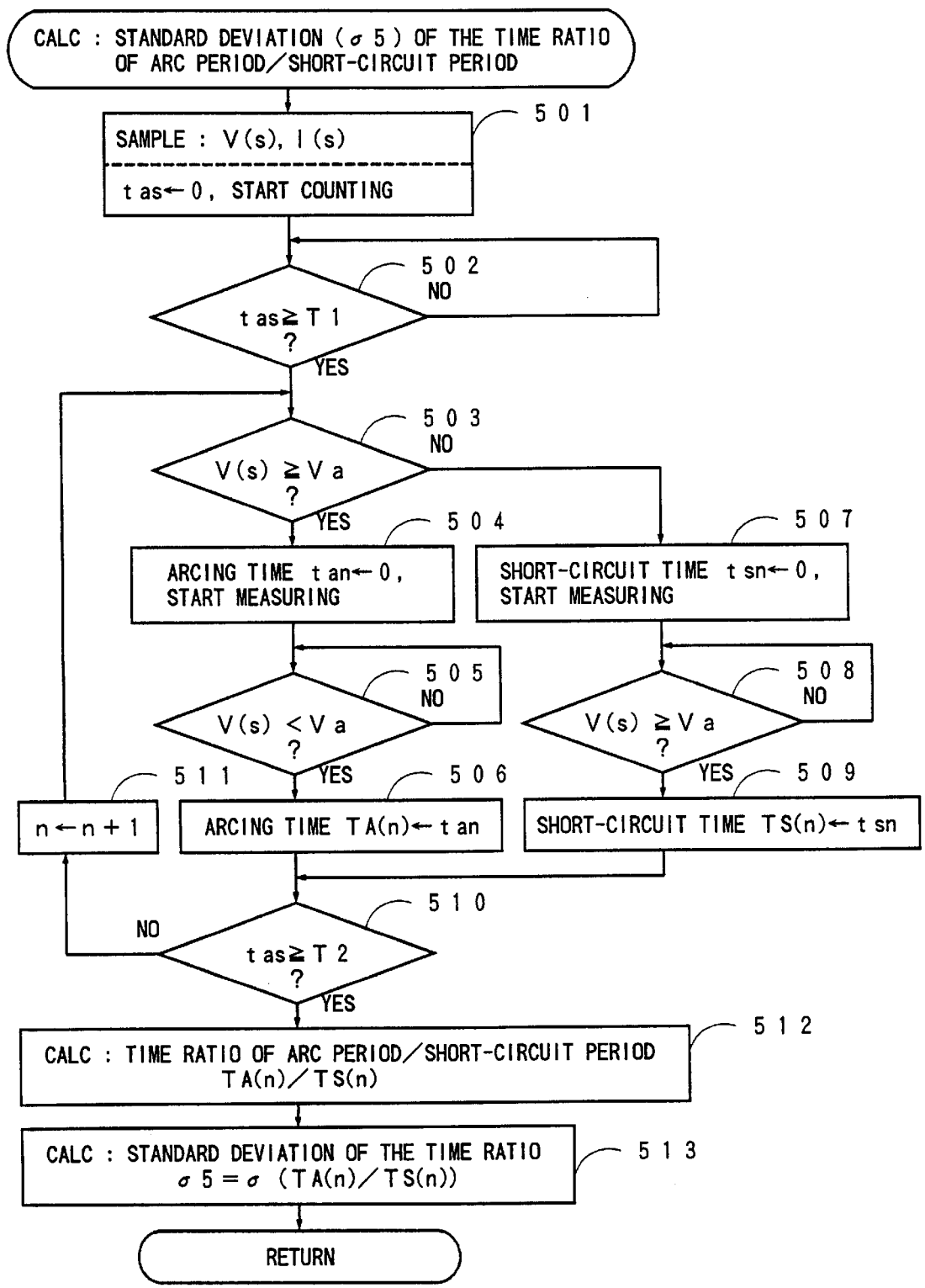
FIG. 9 is a flowchart showing a sub-routine of the calculation of the standard deviation of the time ratio of the arc period and the short-circuit period according to the above embodiment.

On the basis of the data stored as described above, calculated are the standard deviation ($\sigma 1$) of the integrated value of welding current for the arc period ($\int IA(n)dt$), the standard deviation ($\sigma 2$) of the integrated value of welding voltage for the arc period ($\int VA(n)dt$), the standard deviation ($\sigma 3$) of the integrated value of welding current for the short-circuit period ($\int IS(n)dt$), and the standard deviation ($\sigma 4$) of the integrated value of welding voltage for the short-circuit period ($\int VS(n)dt$), as will be described later in detail with reference to FIGS. 7–9. Then, the standard deviations ($\sigma 1$–$\sigma 4$) are multiplied together and then divided by a constant K1 to produce a welding stability parameter (W1), which is compared with a reference value (Kw1). If the welding stability parameter (W1) is equal to or smaller than the reference value (Kw1), it is determined that the arc welding is being performed in a stable condition, and a flag indicative of the stable condition is set at Step 215. If the welding stability parameter (W1) is greater than the reference value (Kw1), it is determined that the arc welding is being performed in an unstable or defective condition, and a flag indicative of the unstable/NG condition is set at Step 216. On the basis of these flags, therefore, the welding stability is determined at Step 110.

FIG. 7 shows the calculation of the standard deviation ($\sigma 1$) of the integrated value of welding current for the arc period ($\int IA(n)dt$) executed at Steps 209. At Step 301, sampling the welding voltage (V(s)) and the welding current (I(s)) is initiated, and a counter for use in this calculation is cleared to be zero, and then the counter starts counting. Then, it is determined at Step 302 whether a time (tai) after the counter started counting has become equal to or greater than a predetermined time (T1), so that the program is held in the stand-by state until the counter will count the predetermined time (T1). When the predetermined time (T1) has elapsed after the sampling was initiated, the program proceeds to Steps 303–307, which will be repeated until the counter will count a predetermined time (T2) at Step 308. That is, at Step 303–307 will be performed the sampling of the welding current (I(s)) supplied to the welding wire 2 and base metal 5 during the time period between the time (T1), at which the determination of welding stability starts, and the time (T2), at which the determination is terminated.

It is determined at Step 303 whether the sampled welding voltage (V(s)) becomes equal to or greater than the reference voltage for determining arc/short-circuit (Va). If the result is affirmative, the program proceeds to Step 304 where measuring the welding current for the arc period (IA(n)) in the "n" cycle is initiated, and continued until the welding voltage (Vs) will become lower than the reference voltage for determining arc/short-circuit (Va). In other words, the measurement of the welding current for the arc period (IA(n)) starts, when the welding voltage (V(s)) becomes equal to or greater than the reference voltage for determining arc/short-circuit (Va) (at Steps 303, 304), and the measurement of the welding current for the arc period (IA(n)) in the "n" cycle ends, when the welding voltage (V(s)) becomes smaller than the reference voltage for determining arc/short-circuit (Va) (at Steps 305, 306). Then, the program proceeds to Step 307 where the cycle (n) is incremented, and further proceeds to Step 308, where it is determined whether the elapsed time (tai) after the start of sampling becomes equal to or greater than the predetermined time (T2). If it is determined that the time (tai) is less than the predetermined time (T2), the program returns to Step 303 and then to Step 304, where the welding current for the arc period (IA(n+1)) in the next cycle will be measured. If it is determined at Step 303 that the welding voltage (V(s)) is smaller than the reference voltage for determining arc/short-circuit (Va), the program proceeds to Step 308, as it is. Thus, Steps 303–307 are repeated until the predetermine time (T2) is elapsed.

Accordingly, when it is determined at Step 308 that the elapsed time (tai) after the start of sampling has become equal to or greater than the predetermined time (T2), the program proceeds to Step 309, where the welding current for the arc period (IA(n)) is integrated during the time period between the predetermined times (T1) and (T2) to produce the integrated value of welding current for the arc period ($\int IA(n)dt$). Then, the standard deviation ($\sigma 1$) of the integrated value ($\int IA(n)dt$) is calculated at Step 310. The integrated value of welding current for the arc period ($\int IA(n)dt$) corresponds to the area enclosed by the waveform of the welding current for the arc period and the abscissa (time axis) in each cycle, as shown by inclined lines in FIG. 4, and its standard deviation of the integrated value ($\sigma(\int IA(n)dt)$) serves as a parameter indicative of dispersion of the welding current for the arc period and the time duration of the arc period, simultaneously. Therefore, if the standard deviation ($\sigma 1$) of the integrated value ($\int IA(n)dt$) is increased, it is presumed that the transfer of the droplet is unstable due to occurrence of an instantaneous arc, in which the short-circuiting is substantially continued, or an long-term arc, in which the short-circuiting does not occur. This means that the smaller the standard deviation ($\sigma 1$) is, the more stable the transfer of the droplet is.

FIG. 8 shows the calculation of the standard deviation ($\sigma 3$) of the integrated value of welding current for the short-circuit period ($\int IS(n)dt$) executed at Steps 211. At Step 401, sampling the welding voltage (V(s)) and the welding current (I(s)) is initiated, and a counter for use in this calculation is cleared to be zero, and then the counter starts counting. Then, it is determined at Step 402 whether a time (tsi) after the counter started counting has become equal to or greater than the predetermined time (T1), so that the program is held in the stand-by state until the counter will count the predetermined time (T1). When the predetermined time (T1) has elapsed after the sampling was initiated, the program proceeds to Steps 403–407, which will be repeated until the counter will count the predetermined time (T2) at Step 408.

It is determined at Step 403 whether the sampled welding voltage (V(s)) becomes equal to or greater than the reference voltage for determining arc/short-circuit (Va). If the result is affirmative, the program proceeds to Step 404 where measuring the welding current for the short-circuit period (IS(n)) in the "n" cycle is initiated, and continued until the welding voltage (Vs) will become lower than the reference voltage for determining arc/short-circuit (Va). In other words, the measurement of the welding current for the short-circuit period (IS(n)) starts when the welding voltage (V(s)) becomes equal to or greater than the reference voltage for determining arc/short-circuit (Va) (at Steps 403, 404), and the measurement of the welding current for the short-circuit period (IS(n)) in the "n" cycle ends when the welding voltage (V(s)) becomes smaller than the reference voltage for determining arc/short-circuit (Va) (at Steps 405, 406). Then, the program proceeds to Step 407 where the cycle (n) is incremented, and further proceeds to Step 408, where it is determined whether the elapsed time (tsi) after the start of sampling becomes equal to or greater than the predetermined time (T2). If it is determined that the time (tas) is less than the predetermined time (T2), the program returns to Step 403, where the welding current for the short-circuit period (IS(n+1)) in the next cycle will be measured. If it is determined at Step 403 that the welding voltage (V(s)) is smaller than the reference voltage for determining arc/short-circuit (Va), the program proceeds to Step 408, as it is. Thus, Steps 403–407 are repeated until the predetermine time (T2) is elapsed.

Accordingly, when it is determined at Step 408 that the elapsed time (tsi) after the start of sampling has become equal to or greater than the predetermined time (T2), the program proceeds to Step 409, where the welding current for the short-circuit period (IS(n)) is integrated during the time period between the predetermined times (T1) and (T2) to produce the integrated value of welding current for the short-circuit period ($\int IS(n)dt$). Then, the standard deviation ($\sigma 3$) of the integrated value ($\int IS(n)dt$) is calculated at Step 410. The integrated value of welding current for the short-circuit period ($\int IS(n)dt$) corresponds to the area enclosed by the waveform of the welding current for the short-circuit period and the abscissa (time axis) in each cycle, as shown by inclined lines in FIG. 4, and its standard deviation of the integrated value ($\sigma(\int IS(n)dt)$) serves as a parameter indicative of dispersion of the welding current for the short-circuit period and the time duration of the short-circuit period, simultaneously. Therefore, if the standard deviation ($\sigma 3$) of the integrated value ($\int IS(n)dt$) is increased, it is presumed that the short-circuiting is unstable due to occurrence of an instantaneous short-circuit, in which the droplet is not substantially transferred, or a long-term short-circuit, in which the short-circuiting is not terminated. This means that the smaller the standard deviation ($\sigma 3$) is, the more stable the short-circuiting is, thereby to perform the transfer of the droplet periodically.

The standard deviation ($\sigma 2$) of the integrated value of welding voltage for the arc period ($\int VA(n)dt$), and the standard deviation ($\sigma 4$) of the integrated value of welding voltage for the short-circuit period ($\int VS(n)dt$) can be calculated, in the same manner as shown in FIGS. 7 and 8, respectively. In addition to the standard deviations ($\sigma 1$–$\sigma 4$), a standard deviation ($\sigma 5$) of the time ratio of the arc period and the short-circuit period (TA(n)/TS(n)) may be calculated, and by combining the standard deviation ($\sigma 5$) with the standard deviations ($\sigma 1$–$\sigma 4$) various welding stability parameters can be provided. FIG. 9 shows the calculation of the standard deviation ($\sigma 5$) of the time ratio of the arc period and the short-circuit period (TA(n)/TS(n)). At Step 501, sampling the welding voltage (V(s)) and the welding current (I(s)) is initiated, and a counter for use in this calculation is cleared to be zero, and then the counter starts counting. Then, it is determined at Step 502 whether a time (tas) after the counter started counting has become equal to or greater than the predetermined time (T1), so that the program is held in the stand-by state until the counter will count the predetermined time (T1). When the predetermined time (T1) has elapsed after the sampling was initiated, the program proceeds to Steps 503–509, which will be repeated until the counter will count the predetermined time (T2) at Step 510. Therefore, if the standard deviation ($\sigma 5$) of the time ratio of the arc period and the short-circuit period (TA(n)/TS(n)) is increased, it is presumed that the transfer of the droplet is unstable due to occurrence of the instantaneous arc, long-term arc, instantaneous short-circuit, long-term short-circuit, or the like. This means that the smaller the standard deviation ($\sigma 5$) is, the more stable the transfer of the droplet is.

Then, it is determined at Step 503 whether the sampled welding voltage (V(s)) becomes equal to or greater than the reference voltage for determining arc/short-circuit (Va). If the result is affirmative, the program proceeds to Step 504 where a time (tan) counted by a counter for use in the arc period is cleared to be zero, and then the counter starts measuring the time for the arc period (arcing time) in the "n" cycle, and continues measuring it until the welding voltage (Vs) will become lower than the reference voltage for determining arc/short-circuit (Va). If it is determined at Step 505 that the sampled welding voltage (V(s)) becomes smaller than the reference voltage for determining arc/short-circuit (Va), the program proceeds to Step 506 where the time (tan) is employed as the time in the arc period (TA(n)). If it is determined at Step 503 that the welding voltage (Vs) becomes lower than the reference voltage for determining arc/short-circuit (Va), the program proceeds to Step 507, where a time (tsn) counted by a counter for use in the short-circuit period is cleared to be zero, and then the counter starts measuring the time in the short-circuit period, and continues measuring it until the welding voltage (Vs) will become equal to or greater than the reference voltage for determining arc/short-circuit (Va). If it is determined at Step 508 that the welding voltage (Vs) has become equal to or greater than the reference voltage (Va), the program proceeds to Step 508, where the time (tsn) is employed as the time in the short-circuit period (TS(n)).

The measurement of time in the arc period (TA(n)) and short-circuit period (TS(n)) is repeated at Steps 503–509 until the predetermined time (T2) is elapsed. That is, it is determined at Step 510 whether the elapsed time (tas) after the start of sampling has become equal to or greater than the predetermined time (T2). If it is determined that the time (tas) is less than the predetermined time (T2), the program proceeds to Step 511, where the cycle "n" is incremented, and returns to Step 503, where the time duration of the arc period (TA(n+1)) and short-circuit period (TS(n+1)) in the next cycle will be measured. If it is determined at Step 510 that the elapsed time (tas) has become equal to or greater than the predetermined time (T2), the program proceeds from Step 510 to Step 512 where the time ratio (TA(n)/TS (n)) of the time in the arc period (TA(n)) and the time in the short-circuit period (TS(n)) is calculated. Then, calculated at Step 513 is the standard deviation ($\sigma 5$) of the time ratio (TA(n)/TS(n)) of the arc period and the short-circuit period. Accordingly, by combining the standard deviation ($\sigma 5$) with the aforementioned standard deviations ($\sigma 1-\sigma 4$), various welding stability parameters can be provided.

For example, a welding stability parameter (W2) is obtained by multiplying the standard deviation ($\sigma 1$), standard deviation ($\sigma 3$) and standard deviation ($\sigma 5$) together, thereby to produce a product, and dividing this product by a constant K2 (i.e., W2=$\sigma 1 \cdot \sigma 3 \cdot \sigma 5$/K2). Another welding stability parameter (W3) is obtained by multiplying the standard deviation ($\sigma 2$), standard deviation ($\sigma 4$) and standard deviation ($\sigma 5$) together, thereby to produce a product, and dividing this product by a constant K3 (i.e., W3=$\sigma 2 \cdot \sigma 4 \cdot \sigma 5$/K3). As the simplest combination, by multiplying the standard deviation ($\sigma 1$) by the standard deviation ($\sigma 3$), and dividing the product by a constant K4, a welding stability parameter (W4) can be obtained (i.e., W4=$\sigma 1 \cdot \sigma 3$/K4). The constants K1–K4 are employed for converting the products multiplied by the standard deviations into the welding stability parameters of practical values.

Since the welding stability parameters (W1–W4) are obtained from the product of the aforementioned standard deviations of the integrated values or the time ratio, as described above, if the welding stability parameters (W1–W4) are relatively large, it can be determined that a uniformity in arc welding is relatively bad, so that the welding stability in arc welding can be determined quantitatively. Any one of the welding stability parameters (W1–W4) may be selected in dependence upon the welding conditions to be required. For example, the welding stability parameter (W1) is effective in the case where a severe welding quality is required, though its computing speed will be slow. The welding stability parameter (W2) is effective to detect an instability of the transfer of the droplet correctly. The welding stability parameter (W3) is effective to detect an instability in arc welding due to the arc termination or the like. It is of course possible to employ every standard deviations ($\sigma 1-\sigma 5$) to produce a welding stability parameter (i.e., $\sigma 1 \cdot \sigma 2 \cdot \sigma 3 \cdot \sigma 4 \cdot \sigma 5$/K5), its calculation will be complicated, and its computing speed will be slow, so that it may be limited to be used only in the case where the severest welding condition is required.

Figure 10:
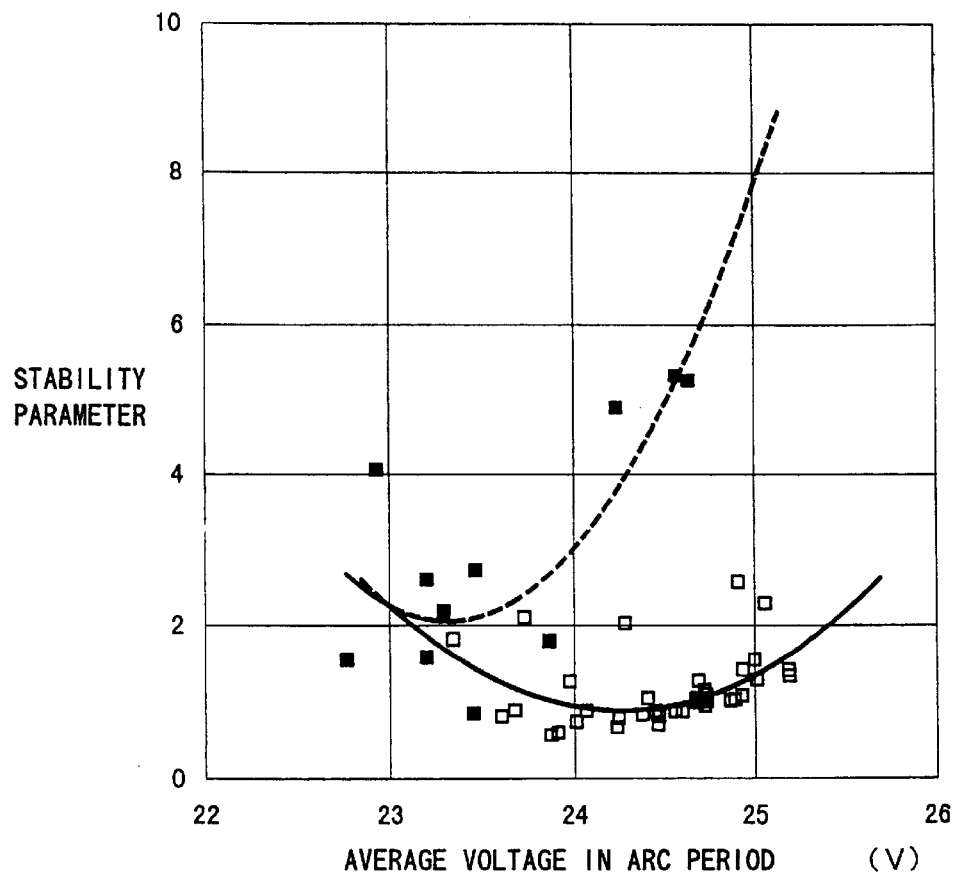
FIG. 10 is a diagram showing a result of an experiment for determining appropriate welding voltage on the basis of one of the welding stability parameters determined according to the above embodiment.
Figure 11:
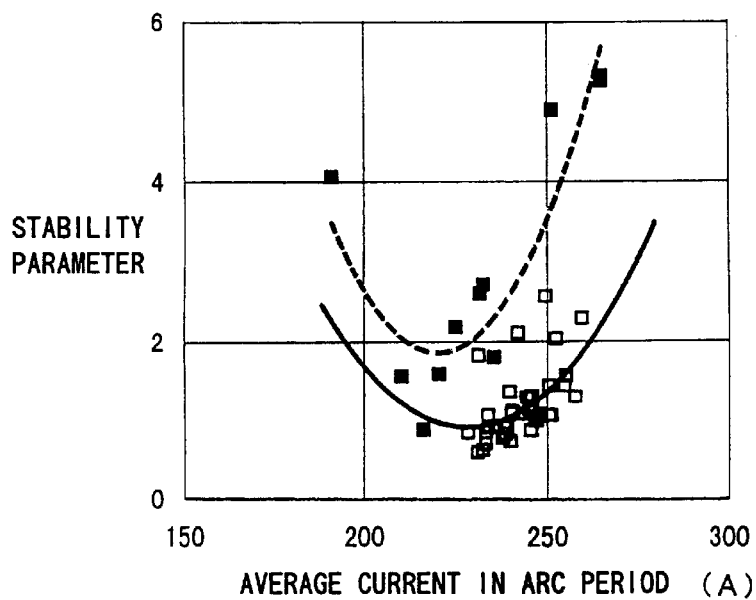
FIG. 11 is a diagram showing a result of an experiment for determining appropriate welding current on the basis of one of the welding stability parameters determined according to the above embodiment.

FIGS. 10 and 11 show a result of an experiment for determining appropriate welding voltage and welding current on the basis of one of the welding stability parameters as described above, when the welding condition is changed. In FIGS. 10 and 11, solid dots and blank dots indicate different welding conditions from each other, and a phantom line is provided for the solid dots, while a solid line is provided for the blank dots. As apparent from the FIGS. 10 and 11, the solid dots is hardly plotted by the curve of the phantom line. Therefore, the condition indicated by the solid line in FIGS. 10, 11, which provides a wide room to the welding voltage and welding current, and a better welding stability, is preferably employed.

In determining the welding stability in the starting stage, the following parameters, which are different from those in the steady-state stage, will be required. That is, it will take a certain time, which is called "no-load voltage time", to cause the short-circuit between the welding wire and the base metal. If the no-load voltage time is too short, a sufficient arc can not be formed. According to the present embodiment, therefore, the cumulative value of the non-load voltage time is compared with a reference value to calculate a difference between them. If this difference exceeds a predetermined allowable range, it is determined to be abnormal. In the case where a high voltage was applied to the welding wire and the base metal to cause the short-circuit between them, if dielectric break down is not caused instantaneously, no arc discharge is caused. This state is called "wire stick", in which the short-circuit current is produced, because the short-circuit is caused between the welding wire and the base metal. As a result, the arc voltage in this case will be lower than the voltage in the arc discharging state. Consequently, by determining the arc voltage applied immediately after the no-load voltage time is terminated, the cumulative time until the arc charge is caused, is employed as the wire stick time, which is compared with a reference value to calculate a difference. And, if this difference exceeds a predetermined allowable range, it is determined to be abnormal.

In the case where the short-circuit time is continued for a relatively long time in the arc starting stage, it is called "a long term short-circuit", the welding power source 1 controls the waveform to open the short-circuit, thereby to supply an excessive short-circuit current. When the arc is formed again, therefore, a spatter of a large scale is produced to cause an instantaneous termination of the arc. Also, in the case where the arc period is continued for a long time, the instantaneous termination of the arc may be caused. In the present embodiment, therefore, the cumulative value of the arc termination time in a predetermined time period is compared with a reference value to calculate a difference. And, if this difference exceeds a predetermined allowable range, it is determined that the arc time is abnormal.

According to the present embodiment, the wire stick time, arc termination time, long term short-circuit time, no-load voltage time, and an increasing rate of an arc starting current, five parameters in total, are employed as the welding stability parameters in the starting stage. If a difference between any one of the parameters and each reference value exceeds a predetermined allowable range, it is determined that the arc welding is unstable or defective. The increasing rate of the arc starting current is the increasing rate of the welding current which is supplied to the welding wire 2 and the base metal 5 during a predetermined time period T3 (e.g., 0.1 msec) after the termination of the no-load voltage time. Thus, the parameters employed in the starting stage are different from those employed in the steady-state stage. According to the present embodiment, the welding operation stages are provided in advance, so that the determination of the welding stability can be made appropriately in each welding operation stage.

It should be apparent to one skilled in the art that the above-described embodiments are merely illustrative of but a few of the many possible specific embodiments of the present invention. Numerous and various other arrangements can be readily devised by those skilled in the art without departing from the spirit and scope of the invention as defined in the following claims.

What is claimed is:

1. A method for determining a stability of arc welding between a base metal and a welding electrode, with a welding voltage applied thereto by a welding power source to supply a welding current, repeating arc and short-circuit between said base metal and said welding electrode, said method comprising the steps of:

sampling the welding current for the arc period and the welding current for the short-circuit period fed from said welding power source into said base metal and said welding electrode, every cycle of the repetition of arc and short-circuit, in accordance with a predetermined frequency;

integrating the welding current for the arc period, and calculating a standard deviation of the integrated welding current for the arc period;

integrating the welding current for the short-circuit period, and calculating a standard deviation of the integrated welding current for the short-circuit period;

multiplying the standard deviation of the welding current for the arc period by the standard deviation of the welding current for the short-circuit period to produce a first product;

sampling the welding voltage for the arc period and the welding voltage for the short-circuit period applied by said welding power source to said base metal and said welding electrode, every cycle of the repetition of arc and short-circuit, in accordance with a predetermined frequency;

integrating the welding voltage for the arc period, and calculating a standard deviation of the integrated welding voltage for the arc period;

integrating the welding voltage for the short-circuit period, and calculating a standard deviation of the integrated welding voltage for the short-circuit period;

multiplying the standard deviation of the welding voltage for the arc period by the standard deviation of the welding voltage for the short-circuit period to produce a second product;

calculating a welding stability parameter on the basis of at least one of said first product and said second product;

comparing the welding stability parameter with a predetermined reference value; and determining the welding stability between said base metal and said welding electrode in response to the result of comparison.

2. The method of claim 1, further comprising the steps of:

calculating a time ratio of the arc period and the short-circuit period every cycle of the repetition of arc and short-circuit in said arc welding;

calculating a standard deviation of said time ratio; and multiplying at least one of said first product and said second product by the standard deviation of said time ratio, wherein said step of calculating the welding stability parameter includes the step of calculating the welding stability parameter on the basis of one of a third product obtained by multiplying said first product by the standard deviation of said time ratio, a fourth product obtained by multiplying said second product by the standard deviation of said time ratio, and a fifth product obtained by multiplying said first product, said second product and the standard deviation of said time ratio together.

3. The method of claim 1, further comprising the step of dividing at least one of a duration for detecting the welding current and a duration for detecting the welding voltage into a plurality of detecting ranges, wherein said step of calculating the welding stability parameter includes the step of calculating the welding stability parameter in each detecting range, respectively, said step of comparing the welding stability parameter includes the step of comparing the welding stability parameter in each detecting range with a predetermined reference, respectively, and said step of determining the welding stability between said base metal and said welding electrode includes the step of determining the welding stability between said base metal and said welding electrode in response to the result of comparison in each detection range, respectively.

4. An apparatus for determining a stability of arc welding between a base metal and a welding electrode, with a welding voltage applied thereto by a welding power source to supply a welding current, repeating arc and short-circuit between said base metal and said welding electrode, comprising:

means for sampling the welding current for the arc period and the welding current for the short-circuit period fed from said welding power source into said base metal and said welding electrode, every cycle of the repetition of arc and short-circuit, in accordance with a predetermined frequency;

means for integrating the welding current for the arc period, and calculating a standard deviation of the integrated welding current for the arc period;

means for integrating the welding current for the short-circuit period, and calculating a standard deviation of the integrated welding current for the short-circuit period;

means for multiplying the standard deviation of the welding current for the arc period by the standard deviation of the welding current for the short-circuit period to produce a first product;

means for sampling the welding voltage for the arc period and the welding voltage for the short-circuit period applied by said welding power source to said base metal and said welding electrode, every cycle of the repetition of arc and short-circuit, in accordance with a predetermined frequency;

means for integrating the welding voltage for the arc period, and calculating a standard deviation of the integrated welding voltage for the arc period;

means for integrating the welding voltage for the short-circuit period, and calculating a standard deviation of the integrated welding voltage for the short-circuit period;

means for multiplying the standard deviation of the welding voltage for the arc period by the standard deviation of the welding voltage for the short-circuit period to produce a second product;

means for calculating a welding stability parameter on the basis of at least one of said first product and said second product;

means for comparing the welding stability parameter with a predetermined reference value; and means for determining the welding stability between said base metal and said welding electrode in response to the result of comparison.

5. The apparatus of claim 4, further comprising:

means for calculating a time ratio of the arc period and the short-circuit period every cycle of the repetition of arc and short-circuit in said arc welding;

means for calculating a standard deviation of said time ratio; and means for multiplying at least one of said first product and said second product by the standard deviation of said time ratio, wherein said means for calculating the welding stability parameter is adapted to calculate the welding stability parameter on the basis of one of a third product obtained by multiplying said first product by the standard deviation of said time ratio, a fourth product obtained by multiplying said second product by the standard deviation of said time ratio, and a fifth product obtained by multiplying said first product, said second product and the standard deviation of said time ratio together.

6. The apparatus of claim 4, further comprising means for dividing at least one of a duration for detecting the welding current and a duration for detecting the welding voltage into a plurality of detecting ranges, wherein said means for calculating the welding stability parameter is adapted to calculate the welding stability parameter in each detecting range, respectively, said means for comparing the welding stability parameter is adapted to compare the welding stability parameter in each detecting range with a predetermined reference, respectively, and said means for determining the welding stability between said base metal and said welding electrode is adapted to determine the welding stability between said base metal and said welding electrode in response to the result of comparison in each detection range, respectively.

* * * * *